(12) United States Patent
Terada et al.

(10) Patent No.: US 7,066,545 B2
(45) Date of Patent: Jun. 27, 2006

(54) HEADREST DEVICE

(75) Inventors: Takami Terada, Toyota (JP); Masatoshi Mori, Anjo (JP); Yoshihiko Nakamura, Okazaki (JP); Masaharu Tanino, Toyota (JP); Masato Ohchi, Toyota (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/992,350

(22) Filed: Nov. 19, 2004

(65) Prior Publication Data

US 2005/0116523 A1 Jun. 2, 2005

(30) Foreign Application Priority Data

Nov. 21, 2003 (JP) ............................. 2003-392165
Jun. 18, 2004 (JP) ............................. 2004-181179

(51) Int. Cl.
*A47C 1/10* (2006.01)
(52) U.S. Cl. .................... 297/410; 297/61; 297/391
(58) Field of Classification Search ............... 297/61, 297/391, 410, 344.1, 408, 409
See application file for complete search history.

(56) References Cited

U.S. PATENT DOCUMENTS

| | | | | |
|---|---|---|---|---|
| 4,285,545 A | * | 8/1981 | Protze ........................ | 297/410 |
| 5,171,062 A | * | 12/1992 | Courtois ...................... | 297/410 |
| 5,346,283 A | * | 9/1994 | Steininger et al. ............ | 297/61 |
| 5,669,666 A | * | 9/1997 | Lee .............................. | 297/410 |
| 5,918,940 A | * | 7/1999 | Wakamatsu et al. ......... | 297/410 |
| 5,927,804 A | * | 7/1999 | Cuevas ........................ | 297/61 |
| 5,975,637 A | * | 11/1999 | Geuss et al. ................. | 297/410 |
| 6,540,299 B1 | * | 4/2003 | Gosk et al. ................... | 297/61 |

FOREIGN PATENT DOCUMENTS

DE 3843616 A1 * 6/1990
JP H7(1995)-34761 8/1995

* cited by examiner

*Primary Examiner*—Peter M. Cuomo
*Assistant Examiner*—Erika Garrett
(74) *Attorney, Agent, or Firm*—Finnegan, Henderson, Farabow, Garrett & Dunner, LLP

(57) ABSTRACT

A headrest device includes a headrest provided over a seatback of a seat, a sliding means for slidably adjusting the seat in back and forth directions, a position-adjusting means for adjusting position of the headrest, and a connecting mechanism connecting the sliding means and the position-adjusting means. The connecting mechanism operates the position-adjusting means in conjunction with operation of the sliding means. The connecting mechanism moves in a first direction when the sliding means moves forward, and the connecting mechanism moves in a second direction when the sliding means moves backward.

11 Claims, 7 Drawing Sheets

HEADREST DEVICE

CROSS REFERENCE TO RELATED APPLICATIONS

This application is based on and claims priority under 35 U.S.C. §119 with respect to Japanese Patent Application No. 2004-181179 filed on Jun. 18, 2004, the entire content of which is incorporated herein by reference.

FIELD OF THE INVENTION

The present invention relates to a headrest device provided at a vehicle seat. More particularly, the present invention pertains to a headrest device for adjusting the height of a headrest in accordance with the sliding movement of a seat, a device which can adjust a seat position in accordance with the physical characteristics of a user.

BACKGROUND

Known headrests provided for a vehicle seat include a manually operated height-adjusting mechanism. Adjusting a headrest to an appropriate height before beginning to drive is important for a user in terms of safety in the eventuality of a collision. However, when, after once adjusting the height of a headrest, the initial user of a vehicle sits down again in the same seat, this person may not notice that the position of the headrest has in the meantime been changed by another user of the same vehicle. Moreover, even when an initial user notices that the position of the headrest has changed, there is a tendency for such a person to use the seat as he/she finds it, without readjusting the height of the headrest, simply because it is too much bother to adjust the height every time that the user uses the seat.

On the other hand, before starting to drive a vehicle drivers usually adjust the position of the seat in a longitudinal direction in order to adjust the seat to their own driving positions. This positioning of a seat in a longitudinal direction is carried out with considerably greater frequency than the adjustment of the headrest mentioned above. It follows from this that if the height of the headrest can be adjusted automatically in conjunction with the positional adjustment of the vehicle seat, a procedure which a user almost invariably performs, the above-mentioned problem can be virtually solved.

In connection with the foregoing, a known vehicle seat having a headrest which moves in accordance with the sliding movement of the seat is described in JPH07-34761Y.

According to the construction described in JPH07-34761Y, a headrest is always biased by a spring to move upward over a seatback, and the headrest is connected to the lower rails of a sliding mechanism fixed by means of wire to a vehicle floor. In a case where a user with a smaller physique sits in the seat, the user moves the seat forward by means of the sliding mechanism. In this case, the wire pulls the headrest downward against the biasing force of the spring. On the other hand, in a case where a user with a larger physique sits in the seat, the user moves the seat backward by means of the sliding mechanism. In this case, the wire is loosened, and pulls up the headrest by the biasing force of the spring. Thus, upward and downward movement of the headrest and the sliding movement of the seat take place in conjunction with one another.

However, a headrest is generally provided on the top of a seatback with stays serving as supporting members. The stays are, for example, slidably positioned in a cylindrical guiding member provided at a frame of the seat. Thus, the user can adjust the headrest to a favorable height, by moving the stays upward and downward, and by fixing with a stopper provided at the guiding member.

Notwithstanding the advantages of the structures described in the known vehicle seat, with the construction of the vehicle seat described in JPH07-34761Y, frictional resistance between the stay and the guiding member has occasions assumed significance because of dimensional inaccuracies. For example, with the construction described in JPH07-34761Y, in a case where frictional resistance between the stays and the guiding member is greater than the biasing force of the spring, the headrest cannot be moved smoothly, and thus can cause problems with the operation of the headrest device.

Moreover, a further problem is that even when appropriate seat positions in a longitudinal direction are the same, the heights of the head positions of a taller person in a seated position and of a shorter person in a seated position can be different. Nonetheless, with the construction of the vehicle seat described in JPH07-34761Y, depending on the physique of the users, an appropriate height of the headrest cannot always be achieved, because the height of the headrest is uniformly determined in accordance with the position of the seat in a longitudinal direction.

A need thus exists for a headrest device, which not only, by means of a sliding mechanism, automatically and smoothly positions the height of the headrest of a vehicle seat in accordance with the position of the seat in a longitudinal direction, but which users can also individually and manually adjust to their own liking, in order to rectify unsuitable positions in the height of a headrest caused by differences in the physical characteristics of persons occupying the seat. The present invention has been made in view of the above circumstances and provides such a headrest device.

SUMMARY OF THE INVENTION

In light of the foregoing, the present invention provides a headrest device, which includes a headrest provided over a seatback of a seat, a sliding means for slidably adjusting the seat in back and forth directions, a position-adjusting means for adjusting position of the headrest, and a connecting mechanism connecting the sliding means and the position-adjusting means. The connecting mechanism operates the position-adjusting means in conjunction with operation of the sliding means. The connecting mechanism moves in a first direction when the sliding means moves forward, and the connecting mechanism moves in a second direction when the sliding means moves backward.

According to another aspect of the present invention, a headrest device includes a headrest provided over a seatback of a seat, at least one stay for supporting the headrest on the seatback, and a position-adjusting device connected to the stay. The position-adjusting device adjusts height of the headrest relative to the seatback in conjunction with a seat slide device for adjusting a back and forth position of the seat relative to a vehicle floor. The headrest device further includes a connecting member, a first end of which is pulled when the seat is moved forward by the seat slide device, and a second end of which is pulled when the seat is moved backward by the seat slide device. The position-adjusting device is in conjunction with the seat slide device by means of the connecting member.

BRIEF DESCRIPTION OF THE DRAWINGS

The foregoing and additional features and characteristics of the present invention will become more apparent from the following detailed description when considered with reference to the accompanying drawings, wherein.

DETAILED DESCRIPTION

Figure 1:
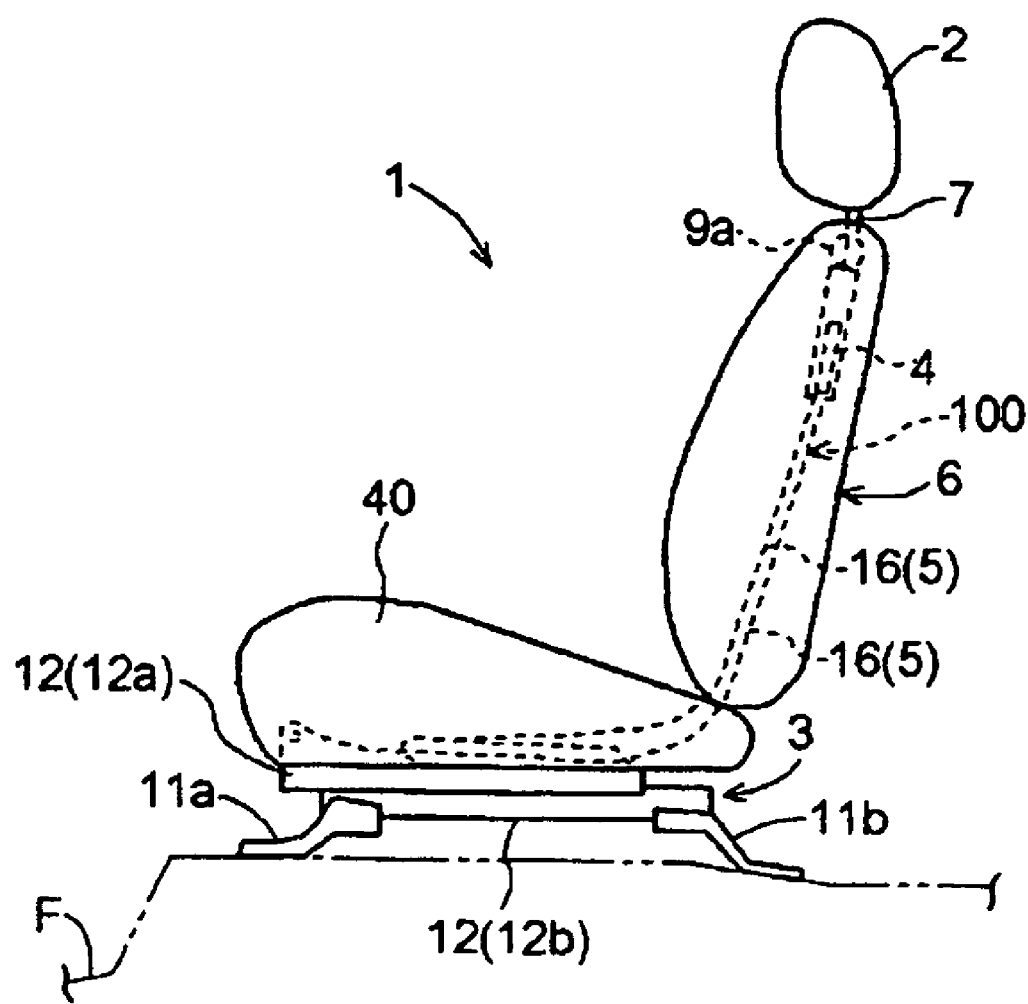
FIG. 1 is an overview of a headrest device provided at a seat.

Embodiments of the present invention will be explained with reference to illustrations of the drawing figures as follows.

As shown in FIG. 1, a headrest device 100 includes a headrest 2, a sliding means 3, a position-adjusting means 4 (i.e., serving as a position-adjusting means, or a position-adjusting device), and a connecting mechanism 5 (i.e., serving as a connecting mechanism, or a connecting member). The construction of the headrest device 100 is explained in detail below.

The headrest 2 is provided on the top of a seatback 6 of a seat 1. Stays 7 are extending downward from the headrest 2. A seatback frame 9a serving as a reinforcement member is fixed at a base plate 9 serving as a frame of the seat 1 in the seatback 6. The headrest 2 is positioned at the top of the seatback frame 9a by means of the stays 7, 7.

The seatback frame 9a includes stay guides 8, 8. The stay guide 8 is configured to penetrate through the seatback frame 9a. The stays 7, 7, of the headrest 2 are positioned in the stay guides 8, 8, respectively, and ends of the stays 7, 7, are fixed to, and supported by, a supporting plate 10. By moving the supporting plate 10 upward and downward, the height of the headrest 2 is adjusted relative to the seatback 6.

The seat 1 is slidingly adjusted in a longitudinal direction by the sliding means 3. The sliding means 3 includes lower rails 12b fixed to a vehicle floor F by means of brackets 11a, 11b, and upper rails 12a provided at a bottom portion of a seat cushion 40, and slidably engaged with the lower rail 12b in a longitudinal direction. A seat slide device of the embodiment includes a pair of seat slides 12 including the lower rail 12b and the upper rail 12a. The sliding means 3 may include a lock mechanism. In order to fix the position of the seat 1, the user adjusts the seat 1 by means of a lock mechanism at a position appropriate to the physique of the user.

The position-adjusting means 4 adjusts the height (i.e., the upward and downward position) of the headrest 2 provided on the top of the seatback 6 of the seat 1. The position-adjusting means 4 is provided in the headrest device 100. The headrest device 100 is provided on the seatback frame 6 to support the bottom ends of the stays 7. The detailed construction of the position-adjusting means 4 will be explained with reference to FIG. 2.

The position-adjusting means 4, for example, includes a rack gear 13 serving as a driven portion provided on the supporting plate 10, and a pinion gear 14 serving as a driving portion driven by the operation of the connecting mechanism 5. By engaging the pinion gear 14 with the rack gear 13, the driving force from the pinion gear 14 can be inputted into the rack gear 13 to transmit the driving force. On the other hand, disengaging the pinion gear 14 from the rack gear 13, transmission of the driving force from the pinion gear 14 can be cut off. Details of engagement and disengagement between the rack gear 13 and the pinion gear 14 will be explained hereinafter.

The position-adjusting means 4 includes the base plate 9 fixed to the seatback frame 9a by means of welding 31. A release lever 19 is rotatably provided at the base plate 9 by means of a rotational shaft 19a. The release lever 19 extending approximately in a lateral direction of the seat 1 is formed with a cam hole 19b at the center.

Figure 3:
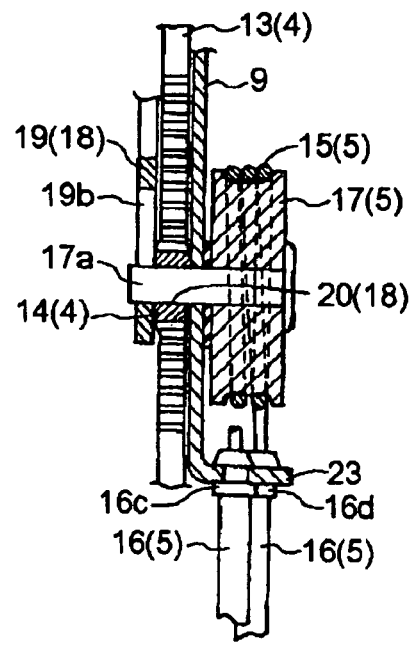
FIG. 3 is a cross-sectional view taken on line III—III of FIG. 2.

As shown in FIG. 3, a pulley 17 is positioned on one side of the base plate 9 and the release lever 19 is provided on the opposite side of the base plate 9. The pulley 17 includes a rotational shaft 17a unitarily fixed thereon, and is positioned to penetrate through a long hole 20 formed on the base plate 9 and extending in a lateral direction. The long hole 20 is configured to have a diameter for rotatably supporting the rotational shaft 17a and is designed so as not to have a degree of clearance which would result in looseness in the upward and downward direction. The rotational shaft 17a is guided by the lateral surface of the base plate 9, and is movable in parallel with the lateral direction of the long hole 20.

The connecting mechanism 5 connects the sliding means 3 and the position-adjusting means 4. When the sliding means 3 is moved by means of the connecting mechanism 5, the position-adjusting means 14 operates in conjunction with the operation of the sliding means 3. A detailed construction of the connecting mechanism 5 will be explained with reference to FIGS. 2–4.

As mentioned above, the seatback frame 9a is provided with the pair of stay guides 8, 8 positioned at predetermined distances in right and left directions, and stays 7, 7, are positioned to penetrate through the stay guides 8, 8, respectively capable of being guided upward and downward. The supporting plate 10 extending in a width direction of the seatback 6 is provided at the bottom ends of the stays 7, 7. The rack gear 13 extending downward is welded at an approximately central portion of the seatback 10 in a width direction. The rack gear 13 is formed with linear teeth 13a which are geared with the pinion gear 14. Thus, upon the clockwise rotation of the pinion gear 14 of FIG. 2, the pinion gear 14 and the linear gear 13a are geared to move the rack gear 13 linearly upward. Accordingly, the headrest 2 unitarily provided with the rack gear 13 is moved upward.

Figure 2:
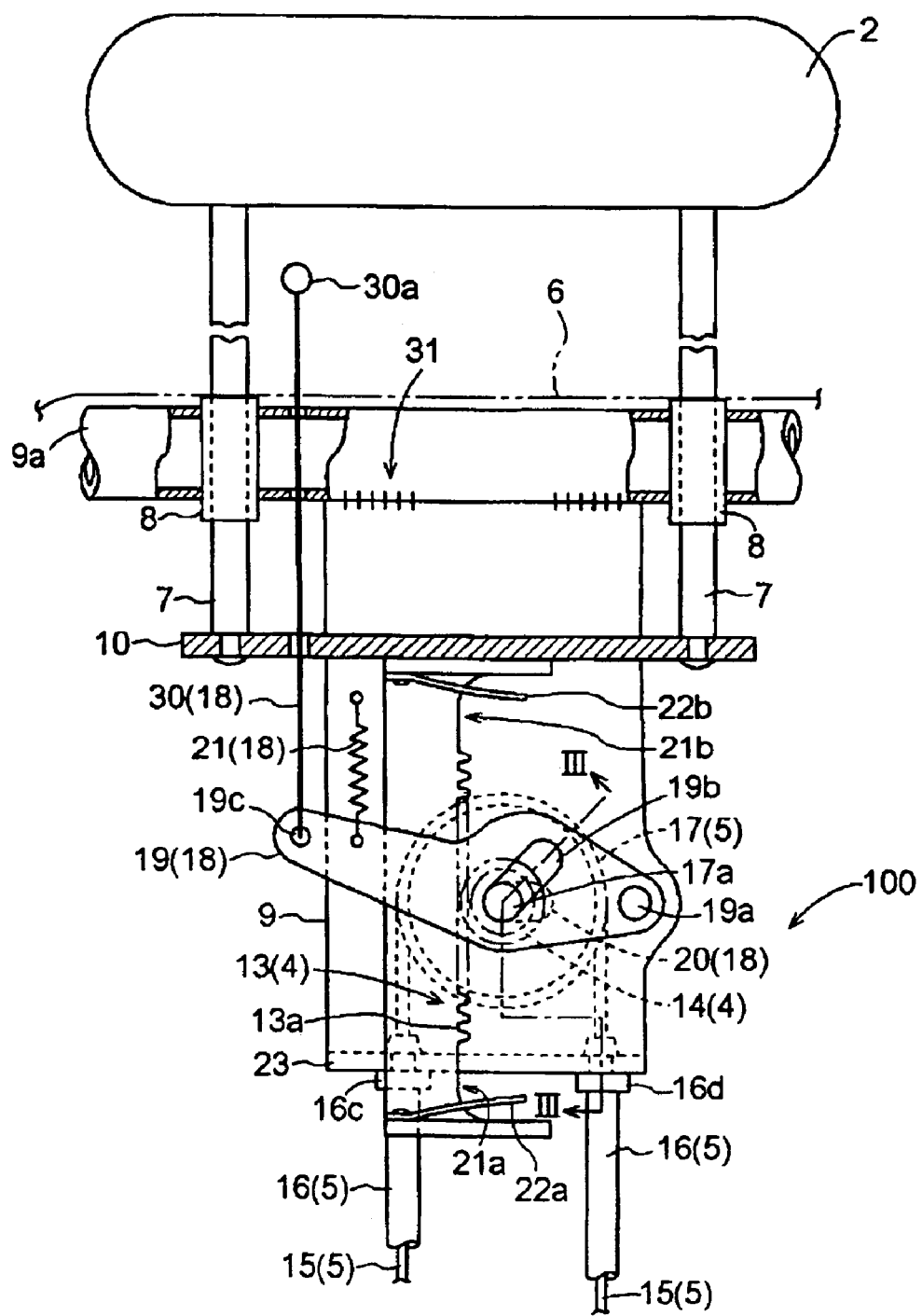
FIG. 2 is a partial plane view showing the headrest device.

As shown in FIG. 2, a wire 15 is wound around an external periphery of the pulley 17. Ends of the wire 15 are respectively introduced into wire covers 16, 16, which are engaged with flange portion 23 which has been formed by bending a bottom end of the base plate 9.

Figure 4:
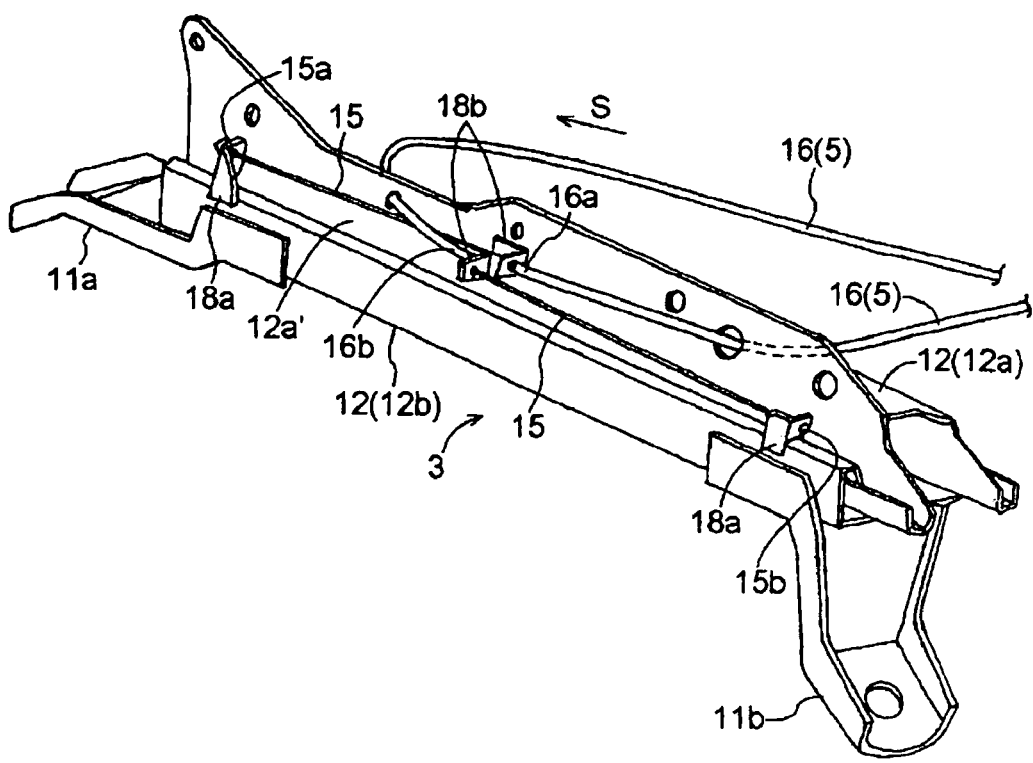
FIG. 4 is a perspective view of a sliding means of the headrest device.

As shown in FIG. 4, the headrest device 100 includes the sliding means 3. The upper rail 12a of the seat slide 12 includes a wall portion 12a' extending upward. A bracket 18b is fixed on a lateral surface of the wall portion 12a', approximately at a central portion in a longitudinal direction of the upper rail 12a. The connecting mechanism 5 includes the wires 15, 15, the ends 15a, 15b of which are fixed to the lower rail 12b of the sliding means 3 by means of brackets 18a, 18a respectively; a pair of wire covers 16, 16 for slidably accommodating the wires 15, 15, first ends 16a, 16b of which are fixed on the upper rail 12a of the sliding means 3 by means of the brackets 18b, 18b respectively and second ends 16c, 16d of which are fixed on the base plate 9 with flange portion 23; and the pulley 17 which is wound with the wire 15 therearound. In an assembled state, the wire 15 provides a predetermined tension. For example, the tension of the wire 15 may be maintained by providing a spring between the ends 15a, 15b and the brackets 18a, 18a respectively.

The connection member includes the wire 15, the wire cover 16, and the pulley 17.

When the upper rail 12a slides forward relative to the lower rail 12b (i.e., direction S of FIG. 4), the end portion 16b of the wire cover 16 moves away from the end portion 15b of the wire 15, and the end portion 16a of the wire cover 16 approaches the end portion 15a of the wire 15 to a similar degree. In other words, one of the wires 15, 15 is drawn from the wire cover 16 at the end portion 15b, and the other wire 15 is retracted to be accommodated in the other wire cover 16 at the end portion 15a. Because the second ends 16c, 16d (i.e., the ends at the headrest side) of the wire cover 16 are fixed on the flange portion 23, the wire 15, which is positioned in the wire cover 16 moves to rotate the pulley 17 in one direction. On the other hand, when the upper rail 12a is moved backward relative to the lower rail 12b, with a reverse operation, the wire 15 rotates the pulley 17 in another direction. With the headrest device 100 of the embodiment according to the present invention, the positioning of the headrest 2 is thus adjusted on the basis of the movement of the pulley 17 in both directions.

As described above, the pulley 17 shown in FIG. 2 rotates counterclockwise. Because the pinion gear 14 unitarily rotates with the pulley 17, the rack gear 13 moves downward. As a result, the headrest 2 connected to the rack gear 13 via the stays 7, 7 moves downward. Because the seat slide 12 is locked at the adjusted position by means of the lock mechanism, the headrest 2 is maintained at the adjusted position. When the seat 1 moves backward, a reverse operation is applied.

With the foregoing operation, the position of the headrest 2 is automatically made higher for taller occupants and lower for shorter occupants.

In order to transmit an undiminished rotational force to the pinion gear 14, the pulley 17 may be coaxially connected to, for example, the pinion gear 14. With this construction, when the pulley 17 rotates in one direction or the other, the pinion gear 14 immediately moves the rack gear 13, which is provided on the support plate 10 upward and downward, thus making it possible to adjust the height of the headrest 2 promptly with high precision.

With the construction of the headrest device 100, the degree of direct upward and downward movement of the headrest 2 is transmitted by means of the slide of seat 1 via the wire 15, and accordingly a precise movement of slide 12 can be ensured irrespective of a degree of frictional resistance generated between the stay guide 8 and the stay 7.

Further, in this embodiment, the base plate 9 may include to advantage a guide member for guiding the rack gear 13. Because the guide member facilitates smooth movement of the rack gear 13 upward and downward, use of the guide member facilitates positioning adjustment of the headrest 2.

Figure 5:
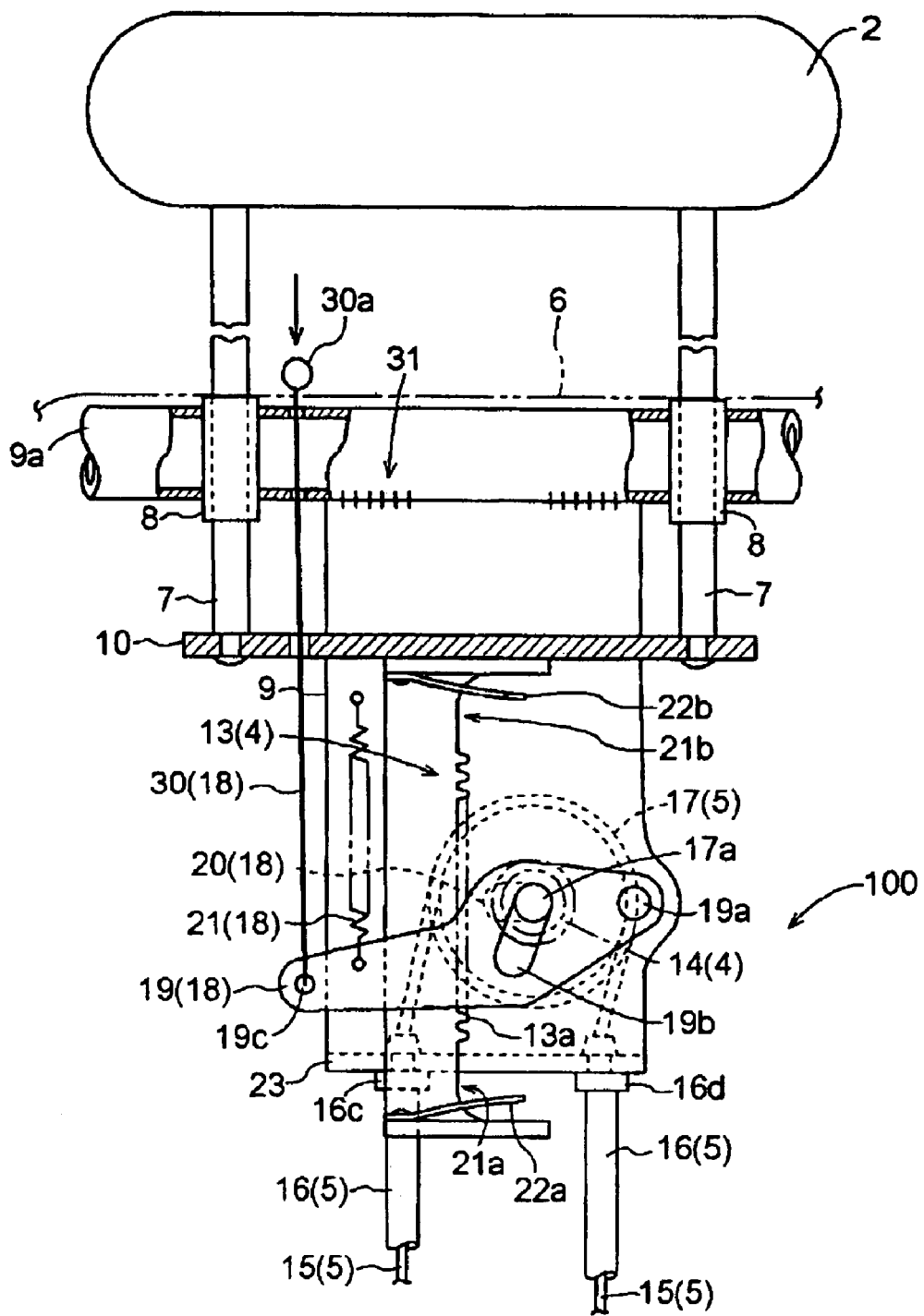
FIG. 5 is a partial plane view of the headrest in which a pinion gear and a rack gear are in a disengaged state.

The headrest device 100 includes an engagement release mechanism 18 for cutting off the drive force from the pinion gear 14 by separating the pinion gear 14 from the rack gear 13. The engagement release mechanism 18 includes the release lever 19, of which a first end is fixed at the base plate 9 via the rotational shaft 19a; a rod 30 is provided at a second end 19b of the release lever 19; a tension spring 21 is provided between the base plate 9 and the release lever 19 for biasing the release lever 19 to rotate clockwise; and the long bore 20 is formed on the base plate 9 for supporting the rotational shaft 17a of the pulley 17 and enabling the rotational shaft 17a to move in a horizontal direction. A cam hole 19b is provided on the release lever 19. The cam hole 19b is configured so as the rotational shaft 17a of the pulley 17 can be inserted therein. In these circumstances, by pushing a knob 30a of the rod 30 downward against the biasing force of the tension spring 21, as shown in FIG. 5, the release lever 19 is made to rotate counterclockwise, and accordingly the rotational shaft 17a of the pulley 17 moves into, and along, the cam hole 19b. Thus, the rotational shaft 17a moves along the interior of the long bore 20 provided on the base plate 9 in a direction which distances itself from the rack gear 13. In this manner, the pinion gear 14 and the rack gear 13 become disengaged. When the pinion gear 14 and the rack gear 13 are in a disengaged state, occupants can freely adjust the height of the headrest 2 manually to a favorable position. Once the height of the headrest 2 has been adjusted, by releasing the pushed knob 30a, the release lever 19 is made to rotate clockwise by means of a biasing force of the tension spring 21, and the rotational shaft 17a of the pulley 17 is moved in a direction in which it approaches the rack gear 13. Thereafter, the pinion gear 14 is re-engaged with the rack gear 13 to maintain the adjusted height of the headrest 2.

Thus, with the headrest device 100 of the embodiment of the present invention, occupants can adjust the height of the headrest 2 to an appropriate position suited to their own physical characteristics, independently of the positional adjustment of the headrest 2 which operates in conjunction with the sliding operation of the sliding means 3. Further, use of the pinion gear 14 and the rack gear 13 as the position-adjusting means 4 is advantageous, insofar that simply by separating the pinion gear 14 from the rack gear 13 it is possible to sever the drive force from the sliding means 3. Although, with the headrest device 100 of the embodiment of the present invention, the pulley 17 is configured so as to be moved in a horizontal direction by means of the engagement release mechanism 18, the flange portion 23 and the wire cover 16 engaged with the flange portion 23 may also be configured to move in a moving direction of the pulley 17 in accordance with the movement of the pulley 17.

The upper limit and the lower limit of the height of the headrest 2 are structurally defined within the length of the linear teeth 13a of the rack gear 13. For example, provided that an occupant disengages the rack gear 13 and the pinion gear 14 at a position where the seat 1 is slid to a relatively forward position, this is tantamount to the occupant setting the height of the headrest 2 close to the upper limit. Thereafter, even when the headrest 2 is close to the upper limit, by further sliding the seat 1 backward, the pinion gear 14 moves the rack gear 13 further upward and thus further moves the headrest 2. In such a case, because the pinion gear 14 is already positioned in the vicinity of the end portion of the linear teeth 13a, merely by a slight backward movement of the seat 1, the pinion gear 14 is able to reach the end of the rack gear 13, thus preventing the rack gear 13 from moving further upward. An unacceptable load is thus applied between the pinion gear 14 and the rack gear 13, and this causes damage to, and breakdowns of, both the pinion gear 14 and the rack gear 13. Accordingly, with the construction of the headrest device 100 according to the embodiment of The present invention, as shown in FIG. 2, recess portions 21a, 21b are respectively formed on both ends of the rack gear 13 so that the pinion gear 14 rotates in a disengaged state.

As shown in FIG. 2, the recess portion 21a corresponds to the upper limit of the height of the headrest 2, and the recess portion 21b corresponds to the lower limit of the height of the headrest 2. An operation in which the pinion gear 14 is positioned at the recess portions 21a, 21b will next be explained with reference to FIG. 6.

Figure 6A:
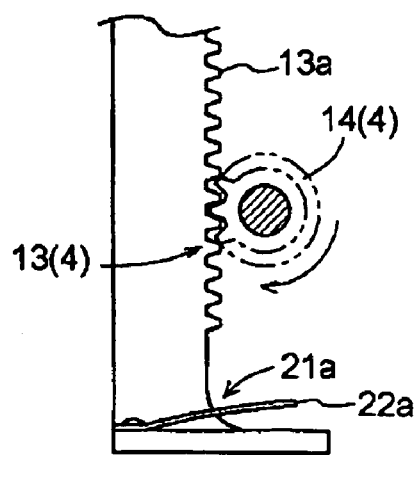
FIGS. 6a–6d are views showing operation of the pinion gear at a recess portion of the rack gear.
Figure 6B:
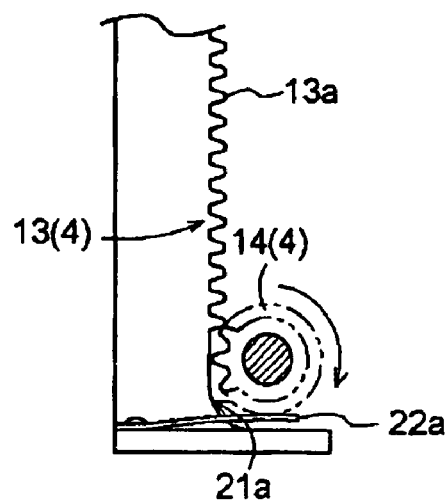
Figure 6C:
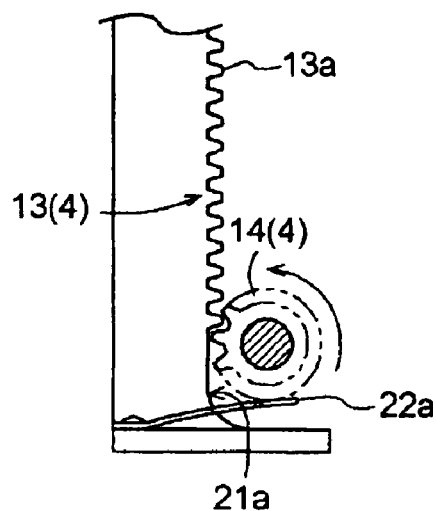
Figure 6D:
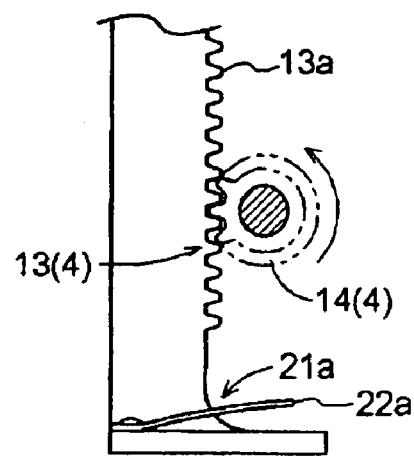

FIG. 6a illustrates a state in which the pinion gear 14 is about to reach the recess portion 21a of the rack gear 13. When the pinion gear 14 is further subjected to clockwise rotation from the state shown in FIG. 6a, the pinion gear 14 reaches the recess portion 21a of the rack gear 13 as shown in FIG. 6b, and idles clockwise at the recess portion 21a. A biasing spring 22a is provided at the recess portion 21a and biases the pinion gear 14 towards the inside of the rack gear 13. By maintaining an appropriate balance in contact with the biasing spring 22a, the pinion gear 14 remains idle. Thereafter, by changing the rotational direction of the pinion gear 14 to counterclockwise, the pinion gear 14 can be easily re-engaged with the rack gear 13. The reason for this is that, because the pinion gear 14 is biased by the effect of the biasing spring 22a to return towards the original direction, the headrest 2 can be moved upward and downward.

While the operation of the pinion gear 14 at the recess portion 21a corresponding to the upper limit of the height of the headrest 2 has been described as an example in FIGS. 6a–6d, the operation of the pinion gear 14 at the recess portion 21b corresponding to the lower limit of the height of the headrest 2 can be likewise explained.

Accordingly, by determining the position of the recess portions 21a, 21b at both ends of the rack gear 13, respectively corresponding to the upper limit and to the lower limit of the headrest 2, to prevent any failure of the headrest device 100 an appropriate moving range of the headrest 2 can be determined. The mechanism constructed with the pinion gear 14 and the rack gear 13 can be achieved at low manufacturing costs, and because excessive stress is unlikely to be applied to the pinion gear 14 and the rack gear 13, both the longevity and reliability of the headrest device 100 can be enhanced.

Figure 7:
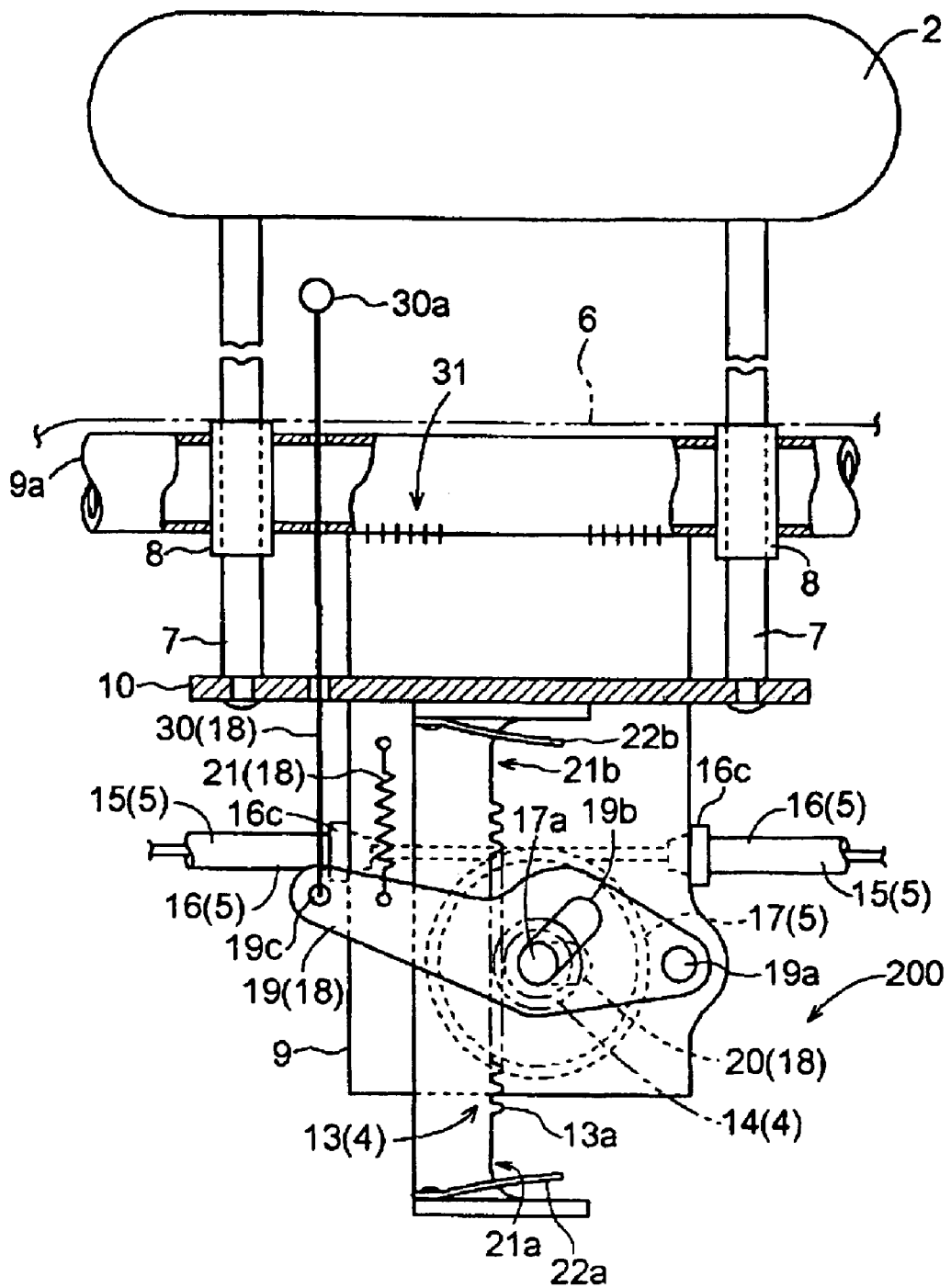
FIG. 7 is a plane view showing a part of a headrest device according to a second embodiment of the present invention.

A second embodiment of the present invention will be explained with reference to FIG. 7. As shown in FIG. 7, a headrest device 200 includes the wires 15, 15 extending from the pulley 17 and approximately parallel to the moving direction of the pulley 17 (i.e., the direction in which the pinion gear 14 moves away from the rack gear 13). Other constructions of the second embodiment of the present invention are the same as for the first embodiment of the present invention.

With the construction of the headrest 200, when the pulley 17 is moved in an engaging or disengaging direction by a means such as operating the knob 30a of the rod 30, the pulley 17 moves approximately parallel to the extending direction of the wire 15. Merely by means of a slight rotation of the pulley 17, the wire 15 can be retracted along the moving direction of the pulley 17. Thus, the headrest device 200 has the merits of reducing the number of breakdowns, and in addition achieving a stable operation.

Figure 8:
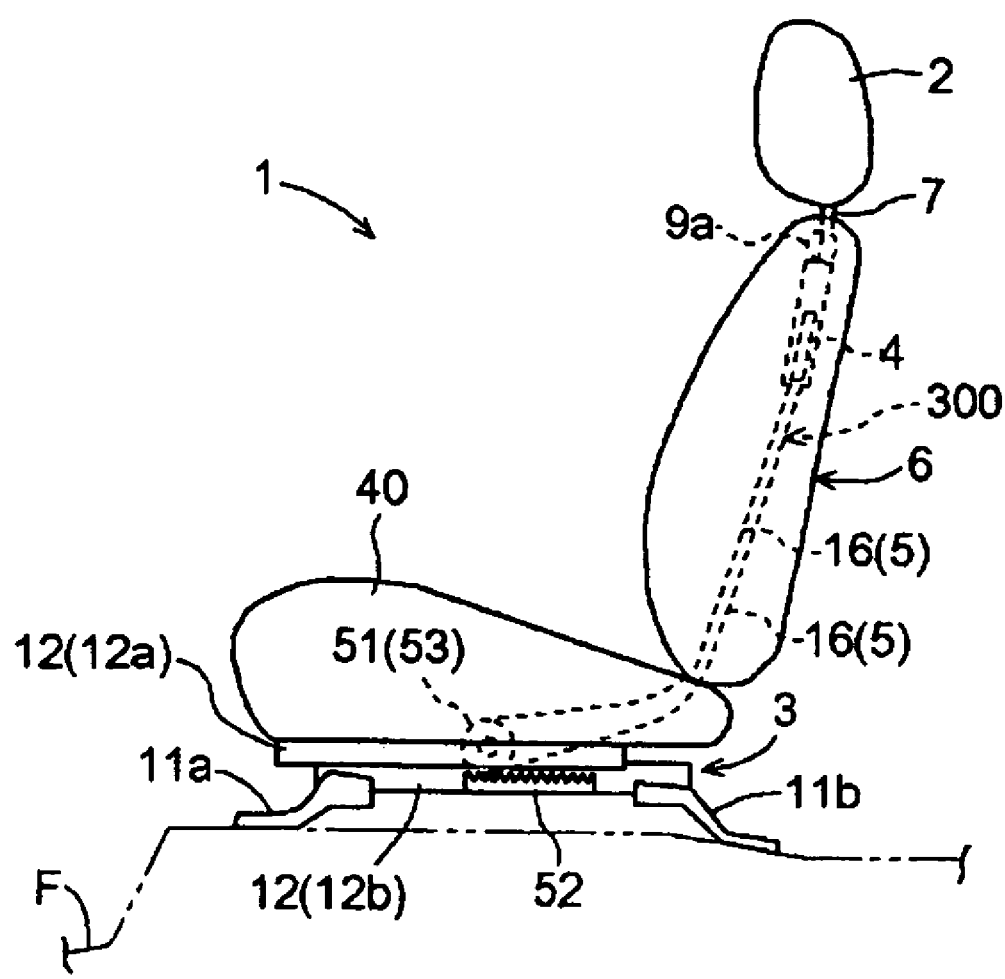
FIG. 8 shows an overview of a headrest device according to a third embodiment of the present invention.

A third embodiment of the present invention will be explained with reference to FIG. 8. As shown in FIG. 8, a headrest device 300 includes a second pinion gear 51, which moves in a back and forth direction in conjunction with the sliding movement of the upper rail 12a of the sliding means 3, and a second rack gear 52, which is fixed at the lower rail 12b of the sliding means 3 and engaged with the second pinion gear 51. Further, the wire 15 is wound around a second pulley 53, which operates in conjunction with the second pinion gear 51.

Although the two wires 15, 15 are provided in the explanation of the embodiments of the present invention, the wire 15 may be operated with a single wire.

Although the headrest device applied to the automobile seat is explained in the embodiment of the present invention, the headrest device may be applied to other seats such as a seat for airplanes, a seat for ships, and a seat for trains.

According to the embodiment of the present invention, the position-adjusting means for adjusting the height of the headrest in conjunction with the sliding operation of the sliding means is operated by means of the connecting mechanism which connects the sliding means and the position-adjusting means. When the sliding means moves forward, the connecting mechanism moves in an initial direction. When the sliding means moves backwards, the connecting mechanism moves in another direction. Thus, because the position of the headrest can be adjusted in two directions by means of the operation of the connecting mechanism in conjunction with the sliding means, the headrest can be securely adjusted even when frictional resistance deriving from dimensional inaccuracies is substantial.

According to the embodiment of the present invention, because by means of an operation of the connecting mechanism to the driven portion, occupants are able to transmit the driving force of the driving portion, and also to cut off transmission thereof, independently of adjusting the height of the headrest which operates in conjunction with the sliding operation of the sliding means, occupants can adjust the position of the headrest to a height appropriate to their own physical characteristics.

Because, according to the embodiment of the present invention, the driving force deriving from the sliding operation of the sliding means can be cut off simply by disengaging the pinion gear from the rack gear, occupants can easily adjust the position of the headrest to a height appropriate to their own physical characteristics.

According to the embodiment of the present invention, when the pinion gear moves to a recess portion at the ends of the rack gear, the pinion gear becomes disengaged from the rack gear, and even when the pinion gear keeps rotating the pinion gear cannot move beyond the recess portion. Thus, by determining the positions of the recess portions at the ends of the rack gear to correspond to the upper and lower limits of the headrest, it becomes possible for an appropriate moving range of the headrest to be determined, and this prevents in advance any possible failure of the headrest device.

According to the embodiment of the present invention, when the pinion gear is positioned at a recess portion, the biasing spring biases the pinion gear towards the center of the rack gear. Thus, after moving to the recess portion the pinion gear is re-engaged with the rack gear by virtue of being biased in the original direction by the effect of the biasing spring.

According to the embodiment of the present invention, because the connecting mechanism which operates in conjunction with the sliding means includes the pulley and the wire wound around the pulley, the height of the headrest can be readily and securely adjusted, at relatively low manufacturing costs.

According to the embodiment of the present invention, because the driving force from the driving portion to the driven portion is cut off in accordance with the movements of the pulley and the direction of the wire extending from the pulley is arranged approximately in parallel with the moving direction of the pulley, excessive stress is not applied to either the pulley or the wire. Thus, breakdowns of the headrest can be reduced and a stable operation can be achieved.

According to the embodiment of the present invention, because the headrest is moved upward and downward in accordance with the back and forth movement of the seat by means of the seat slide device, the headrest can be moved without being adversely influenced by dimensional inaccuracies between the headrest stays and the stay guides.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A headrest device comprising:
a headrest provided over a seatback of a seat;
a sliding means for slidably adjusting the seat in back and forth directions;
a position-adjusting means for adjusting a position of the headrest; and
a connecting mechanism connecting the sliding means and the position-adjusting means, the connecting mechanism operating the position-adjusting means in conjunction with operation of the sliding means; wherein
the connecting mechanism moves in a first direction when the sliding means moves forward, and the connecting mechanism moves in a second direction when the sliding means moves backward;
the position-adjusting means includes a driving portion operated by the connecting mechanism, and a driven portion moved in conjunction with the headrest; and
transmission of a driving force from the driving portion is selectively inputted into and cut off from the driven portion;
and further wherein the driving portion includes a pinion gear;
the driven portion includes a rack gear selectively engaged with the pinion gear; and the driving force is cut off by separating the pinion gear from the rack gear.

2. The headrest device according to claim 1, wherein
the connecting mechanism includes a pulley, and a wire wound around the pulley;
wherein the wire is configured to be pulled in a first direction when the sliding means moves forward, and to be pulled in a second direction when the sliding means moves backward;
the pulley is moved in conjunction with operation of the wire; and
the position-adjusting means is operated by means of operation of the pulley.

3. The headrest device according to claim 1, wherein
the connecting mechanism includes a pulley, and a wire wound around the pulley;
wherein the wire is configured to be pulled in a first direction when the sliding means moves forward, and to be pulled in a second direction when the sliding means moves backward;
the pulley is moved in conjunction with operation of the wire; and
the position-adjusting means is operated by means of operation of the pulley.

4. The headrest device according to claim 1, wherein
the connecting mechanism includes a pulley, and a wire round around the pulley;
wherein the wire is configured to be pulled in a first direction when the sliding means moves forward, and to be pulled in a second direction when the sliding means moves backward;
the pulley is moved in conjunction with operation of the wire; and
the position-adjusting means is operated by means of operation of the pulley.

5. The headrest device according to claim 1, wherein
the connecting mechanism includes a pulley, and a wire round around the pulley;
the driving force transmitted from the driving portion to the driven portion is selectively cut off in accordance with movement of the pulley; and
extending direction of the wire extending from the pulley is determined to be approximately parallel to a moving direction of the pulley.

6. A headrest device comprising:
a headrest provided over a seatback of a seat;
a sliding means for slidably adjusting the seat in back and forth directions;
a position-adjusting means for adjusting a position of the headrest;
a connecting mechanism connecting the sliding means and the position-adjusting means, the connecting mechanism operating the position-adjusting means in conjunction with operation of the sliding means;
wherein the connecting mechanism moves in a first direction when the sliding means moves forward, and the connecting mechanism moves in a second direction when the sliding means moves backward;
wherein the position-adiusting means includes a driving portion operated by the connecting mechanism, and a driven portion moved in conjunction with the headrest; and wherein transmission of a driving force from the driving portion is selectively inputted into and cut off from the driven portion; and
further comprising a pinion gear included in the driving portion;
a rack gear included in the driven portion, being selectively engaged with the pinion gear; and
recess portions provided on end portions of the rack gear in order to rotate the pinion gear in a disengaged state.

7. The headrest device according to claim 6, wherein
the connecting mechanism includes a pulley, and a wire round around the pulley;
wherein the wire is configured to be pulled in a first direction when the sliding means moves forward, and to be pulled in a second direction when the sliding means moves backward;
the pulley is moved in conjunction with operation of the wire; and
the position-adjusting means is operated by means of operation of the pulley.

8. The headrest device according to claim 6, further comprising:
a biasing spring provided at each said recess portion, for biasing the pinion gear towards the center of the rack gear.

9. The headrest device according to claim 7, wherein
the connecting mechanism includes a pulley, and a wire round around the pulley;
wherein the wire is configured to be pulled in a first direction when the sliding means moves forward, and to be pulled in a second direction when the sliding means moves backward;
the pulley is moved in conjunction with operation of the wire; and
the position-adjusting means is operated by means of operation of the pulley.

10. The headrest device according to claim 6, wherein
the connecting mechanism includes a pulley, and a wire round around the pulley;
the driving force transmitted from the driving portion to the driven portion is selectively cut off in accordance with movement of the pulley; and
extending direction of the wire extending from the pulley is determined to be approximately parallel to a moving direction of the pulley.

11. The headrest device according to claim 8, wherein
the connecting mechanism includes a pulley, and a wire round around the pulley;
the driving force transmitted from the driving portion to the driven portion is selectively cut off in accordance with movement of the pulley; and
extending direction of the wire extending from the pulley is determined to be approximately parallel to a moving direction of the pulley.

* * * * *

UNITED STATES PATENT AND TRADEMARK OFFICE
CERTIFICATE OF CORRECTION

PATENT NO. : 7,066,545 B2
APPLICATION NO. : 10/992350
DATED : June 27, 2006
INVENTOR(S) : Takami Terada et al.

It is certified that error appears in the above-identified patent and that said Letters Patent is hereby corrected as shown below:

In claim 4, column 10, line 11, "round" should read --wound--;

In claim 5, column 10, line 22, "round" should read --wound--;

In claim 7, column 10, line 59, "round" should read --wound--;

In claim 9, column 11, line 6, "claim 7," should read --claim 8,--;

In claim 9, column 11, line 8, "round" should read --wound--;

In claim 10, column 11, line 19, "round" should read --wound--; and

In claim 11, column 12, line 10, "round" should read --wound--.

Signed and Sealed this

Twenty-first Day of November, 2006

JON W. DUDAS
*Director of the United States Patent and Trademark Office*